United States Patent
Asama

(10) Patent No.: US 7,082,362 B2
(45) Date of Patent: Jul. 25, 2006

(54) CYLINDER IDENTIFICATION DEVICE FOR INTERNAL COMBUSTION ENGINE

(75) Inventor: Hidehiko Asama, Toyota (JP)

(73) Assignee: Densor Corporation, Kariya (JP)

( * ) Notice: Subject to any disclaimer, the term of this patent is extended or adjusted under 35 U.S.C. 154(b) by 0 days.

(21) Appl. No.: 11/090,792

(22) Filed: Mar. 25, 2005

(65) Prior Publication Data

US 2005/0212509 A1 Sep. 29, 2005

(30) Foreign Application Priority Data

Mar. 25, 2004 (JP) .............................. 2004-089462

(51) Int. Cl.
*G06F 17/00* (2006.01)
*G01B 7/30* (2006.01)
*F02D 41/06* (2006.01)

(52) U.S. Cl. .................. 701/103; 123/491; 324/207.25; 701/113

(58) Field of Classification Search ............. 123/90.15, 123/406.61, 406.62, 476, 491, 612, 617, 123/179.1, 179.16; 701/101, 102, 103, 104, 701/105, 110, 111, 113; 73/116; 324/207.2, 324/207.25

See application file for complete search history.

(56) References Cited

U.S. PATENT DOCUMENTS

| | | | | |
|---|---|---|---|---|
| 5,735,241 A | * | 4/1998 | Matsuura | ..................... 123/305 |
| 6,578,551 B1 | * | 6/2003 | Yuya et al. | .................. 123/491 |
| 6,612,296 B1 | * | 9/2003 | Yonezawa et al. | ........ 123/179.1 |
| 6,761,139 B1 | * | 7/2004 | Takahashi et al. | ........ 123/90.15 |
| 6,880,504 B1 | * | 4/2005 | Takahashi | ................. 123/90.15 |

FOREIGN PATENT DOCUMENTS

| | | | | |
|---|---|---|---|---|
| JP | 60-240875 | | 11/1985 | |
| JP | 10-18895 | | 1/1998 | |
| JP | 2005098200 A | * | 4/2005 | .................. 123/491 |

\* cited by examiner

*Primary Examiner*—Willis R. Wolfe, Jr.
(74) *Attorney, Agent, or Firm*—Nixon & Vanderhye P.C.

(57) ABSTRACT

A cylinder identification device has an intake cam sensor and an exhaust cam sensor which output signals indicative of a rotation angle of the camshaft. The levels of the output signals are varied according to the rotation angle of the crankshaft. The cylinder identification is conducted based on an order of combination variation of the output signal levels. The changing positions of the output signal levels of at least one of the intake cam sensor and the exhaust cam sensor are arranged in such a manner to correspond to positions or right before positions in which the fuel can be initially injected at the time of the engine starting. Thus, the cylinder identification device can identify the initial cylinder in a short period, into which the fuel is initially injected at the time of the engine starting, whereby the startability of the engine is enhanced.

8 Claims, 8 Drawing Sheets

CYLINDER IDENTIFICATION DEVICE FOR INTERNAL COMBUSTION ENGINE

CROSS REFERENCE TO RELATED APPLICATIONS

This application is based on and incorporates herein by reference Japanese Patent Application No. 2004-89462 filed on Mar. 25, 2004, the disclosure of which is incorporated herein by reference.

FIELD OF THE INVENTION

The present invention relates to a cylinder identification device for an internal combustion engine, the internal combustion engine equipped with an intake cam sensor and an exhaust cam sensor.

BACKGROUND OF THE INVENTION

Generally, an internal combustion engine for a vehicle, which is referred to as an engine hereinafter, is provided with a cam sensor which detects a reference position of a camshaft, and a crank sensor which outputs pulse signals indicative of a rotational position of the crankshaft. A cylinder identification is conducted based on the pulse signals, and a crank angle is detected based on the number of the pulse signals. Alternatively, a crank rotor of the crank sensor has a teeth-lacked portion, which corresponds to several pulse signals in a predetermined crank angel. According to a detection of the teeth-lacked portion based on an interval of the pulse signals, the reference position of the crankshaft is detected so that the cylinder identification is conducted. In the above structures, when the engine is turned on, a cylinder into which a fuel is initially injected is unidentified until a starter conducts cranking of the engine. Before the cylinder identification, fuel injection cannot be conducted, whereby a staring time of the engine is delayed.

In order to solve the above problems, as shown in JP-60-240875A and JP-10-18895A, the stop position of the engine is memorized in a memory. At a next starting of the engine, the initial cylinder, into which the fuel is initially injected, is identified based on the memorized stop position of the engine.

The engine, however, runs for a while by the inertia thereof after an ignition switch is turned off to terminate ignitions and fuel injections. Just before the engine stops completely, a piston in a compression stroke may hardly pass over the top dead center (TDC) by a compression pressure in the cylinder, which causes a reverse stroke of the piston, so that the precise detection of the stop position of the engine is hardly obtained. The reverse stroke of the piston cannot be detected. Thus, even if the stop position of the engine is memorized, the initial cylinder into which the fuel is injected at the time of the engine starting may be misidentified due to the incorrectness of the memorized data, whereby a startability and an emission of the engine are deteriorated.

SUMMARY OF THE INVENTION

The present invention is made in view of the foregoing matter and it is an object of the present invention to provide a cylinder identification device that can identify the initial cylinder in a short period, into which the fuel is initially injected at the time of the engine starting, whereby the startability of the engine is enhanced.

According to the present invention, the cylinder identification device has an intake cam sensor and an exhaust cam sensor which output signals indicative of a rotation angle of the camshaft. The levels of the output signals are varied according to the rotation angle of the crankshaft. The cylinder identification is conducted based on an order of combination variation of the output signal levels. The changing positions of the output signal levels of at least one of the intake cam sensor and the exhaust cam sensor are arranged in such a manner to correspond to positions or right before positions in which the fuel can be initially injected at the time of the engine starting.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

An embodiment of the present invention will be described hereinafter with reference to the drawings.

Figure 1:
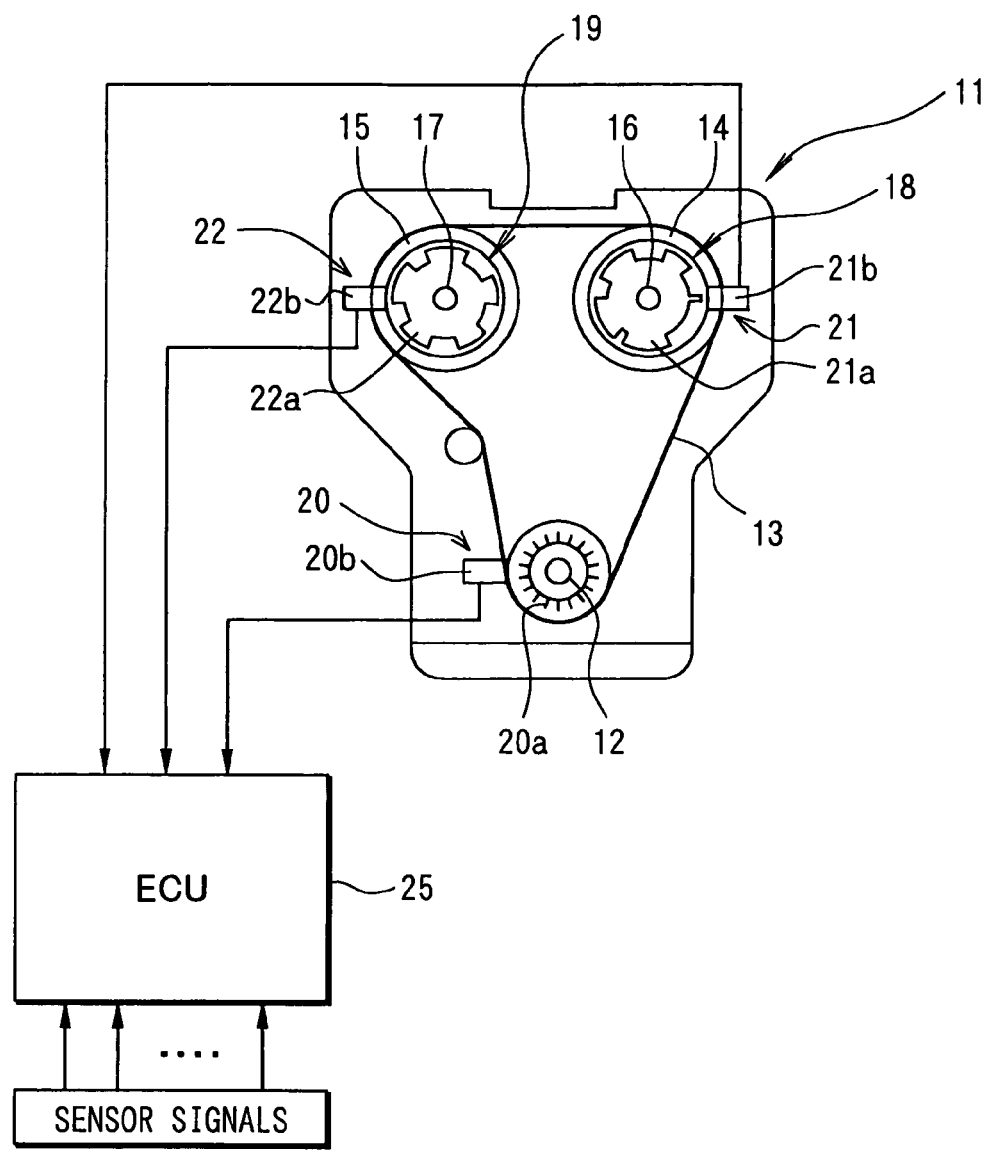
FIG. 1 is a schematic view showing an engine control system according to an embodiment of the present invention.

Referring to FIG. 1, a driving force of an engine 11 is transferred from a crankshaft 12 to an intake camshaft 16 and an exhaust camshaft 17 through a timing chain 13 and sprockets 14, 15.

The intake camshaft 16 and the exhaust camshaft 17 are respectively provided with valve timing controllers 18, 19, which adjust opening/closing timing of an intake and an exhaust valve (not shown) by varying a rotational phase of the camshafts 16, 17 relative to the crankshaft 12.

Figure 4:
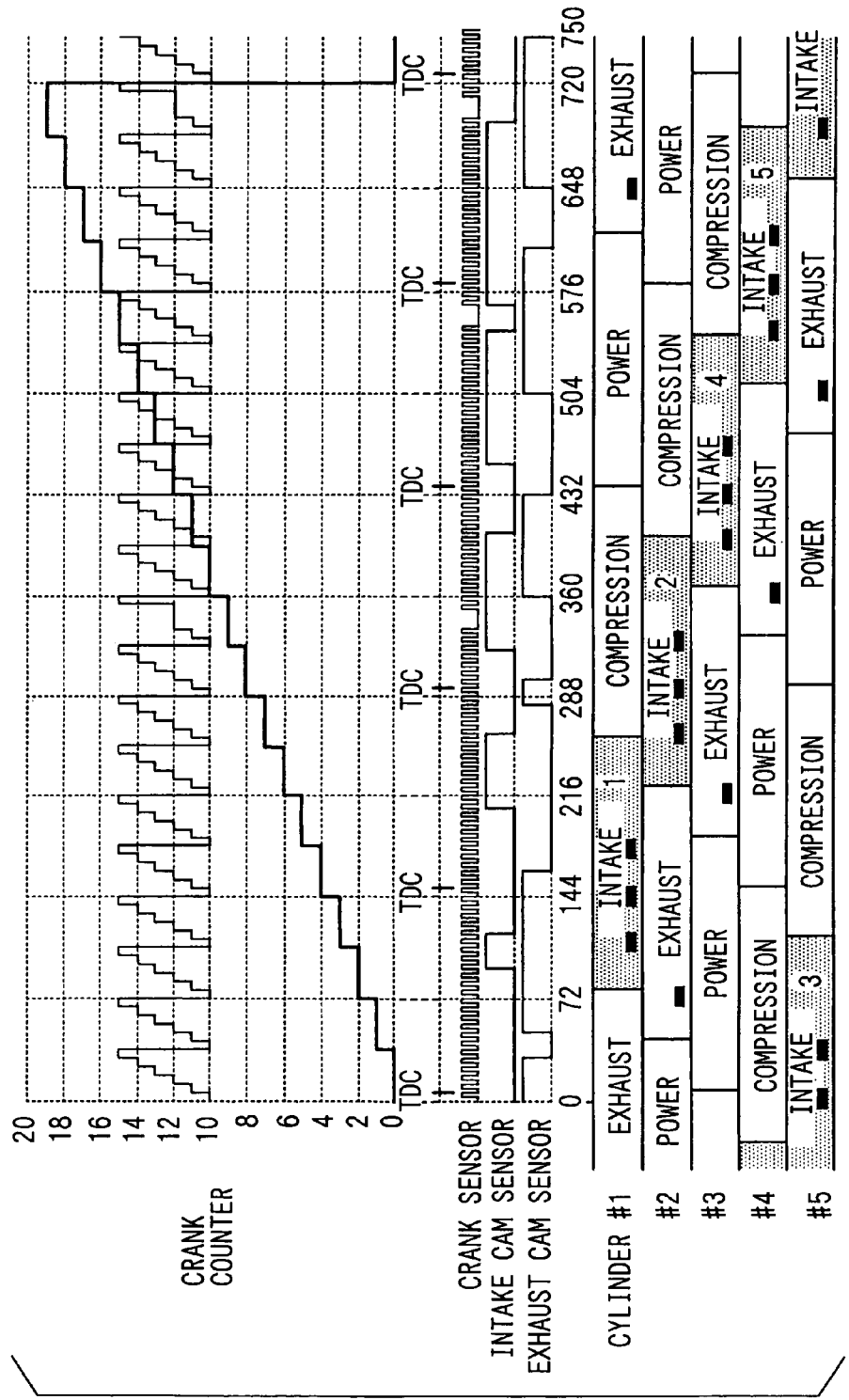
FIG. 4 is a time chart showing output signals of a crank sensor and cam sensors, a behavior of a crank counter, and strokes of each cylinder.

The crankshaft 12 is provided with a crank sensor 20, which includes a crank rotor 20a rotating with the crankshaft 12 and a sensor portion 20b fixed on a predetermined position. The crank rotor 20a has teeth at an outer circumferential surface thereof, which are arranged at uniform intervals of a predetermined crank angle, for example, 6° CA. The crank rotor 20a has a teeth-lacked portion that corresponds to a certain number of teeth at a specified crank angle position, which is referred to as a reference crank angle position. As shown in FIG. 4, the sensor portion 20b of the crank senor 20 detects the teeth to output crank pulse signals at uniform intervals and detects the teeth-lacked portion to output no crank pulse signal. At the teeth-lacked portion (the reference crank angle position), the adjacent two crank pulse signals have a longer pulse interval therebetween than other crank pulse signals.

Figure 2:
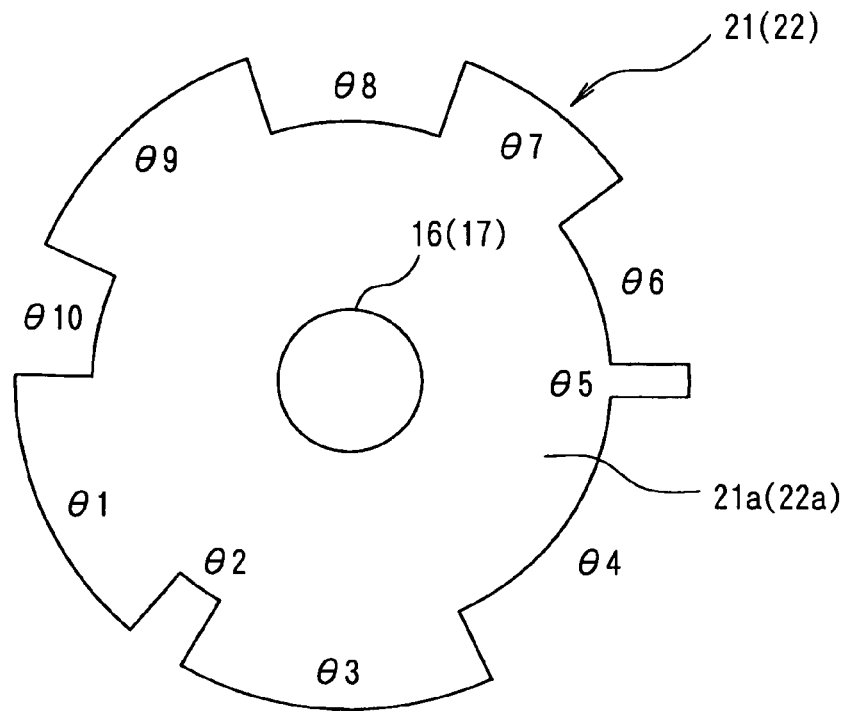
FIG. 2 is a front view of a cam rotor.
Figure 3:
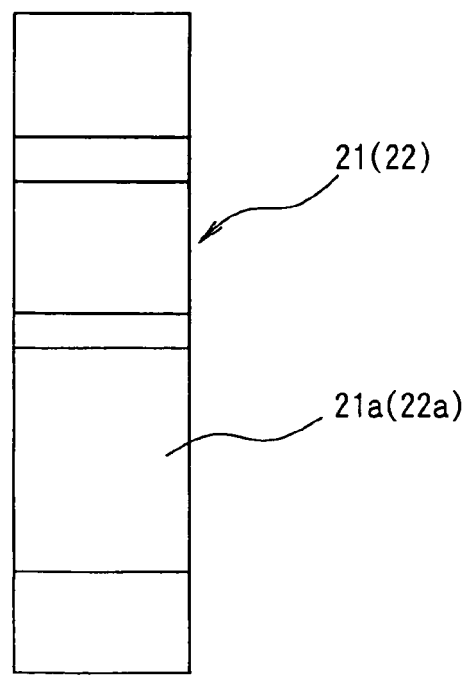
FIG. 3 is a side view of the cam rotor.

The intake camshaft 16 and the exhaust camshaft 17 are respectively provided with an intake cam sensor 21 and an exhaust cam sensor 22. Each of the cam sensors 21, 22 respectively has a cam rotor 21a, 22a rotating with each of the camshafts 16, 17, and a sensor portion 21b, 22b which detects teeth formed on the outer circumferential surface on the cam rotor 21a, 22a as shown in FIGS. 2 and 3. Each of the sensor portion 21b, 22b outputs pulse signals in high level "H" at the cam angle position in which the teeth ($\theta 1$, $\theta 3$, $\theta 5$, $\theta 7$, $\theta 9$ in FIG. 2) of the cam rotor 21a, 22a are detected, and outputs pulse signals in low level "L" at the cam angle position in which no teeth ($\theta 2$, $\theta 4$, $\theta 6$, $\theta 8$, $\theta 10$ in FIG. 2) are detected.

An electric control unit 25, which is referred to as ECU hereinafter, receives all of the output signals from each cam sensors 21, 22, the crank sensor 20, and a coolant temperature sensor (not shown). The ECU 25 includes a microcomputer and executes engine control programs stored in a ROM to control a fuel amount injected by a fuel injection valve (not shown) and an ignition timing of a spark plug (not shown).

The ECU 25 conducts the cylinder identification based on an order of combination variation of the output signal levels from each of the cam sensor 21, 22, and determines a stop position of the engine bases on the order. The ECU 25 serves as a stop position determining means in the present invention. A nonvolatile memory such as a backup RAM stores information including the stop position of the engine. The ECU 25 detects a crank angle by counting crank pulse signals output from the crank sensor 20, referring to the teeth-lacked portion (the reference crank angle position), and detects a rotational speed of the engine based on the intervals of the crank pulses, which corresponds to a frequency.

As shown in FIGS. 4 to 7, the present embodiment has a distinctive way in which the changing positions of the output signal levels of each cam sensor 21, 22 is determined. The changing positions of the output signal levels are referred to as signal changing positions hereinafter. The signal changing positions, which correspond to edges of the teeth of the cam rotor 21a, 22a are determined in a following standard #1 to #5. The five-cylinder engine is used in this embodiment.

[Standard #1]

The signal changing positions (teeth edges of the cam rotor 21a, 22a) of one of the cam sensors 21, 22 are arranged in such a manner to correspond to positions or right before positions in which the fuel can be initially injected at the time of the engine starting. In the five-cylinder engine, the positions in which the fuel can be initially injected at the time of engine starting are arranged in three positions in intake stroke cylinders and one position of an exhaust stroke cylinder. In FIG. 4, the positions in which the fuel can initially be injected are illustrated by rectangular black boxes.

Figure 5:
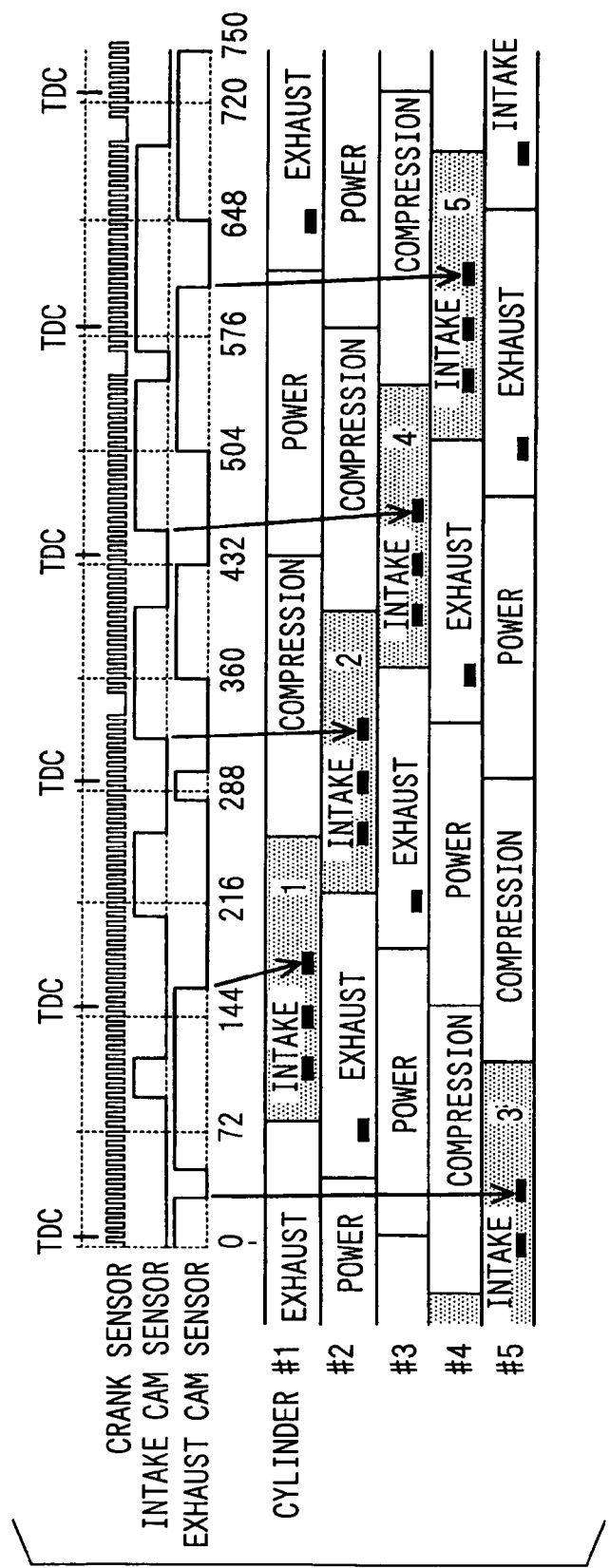
FIG. 5 is a time chart showing a relationship between initially injectable positions of fuel and changing positions of output signal levels of each cam sensor.
Figure 6:
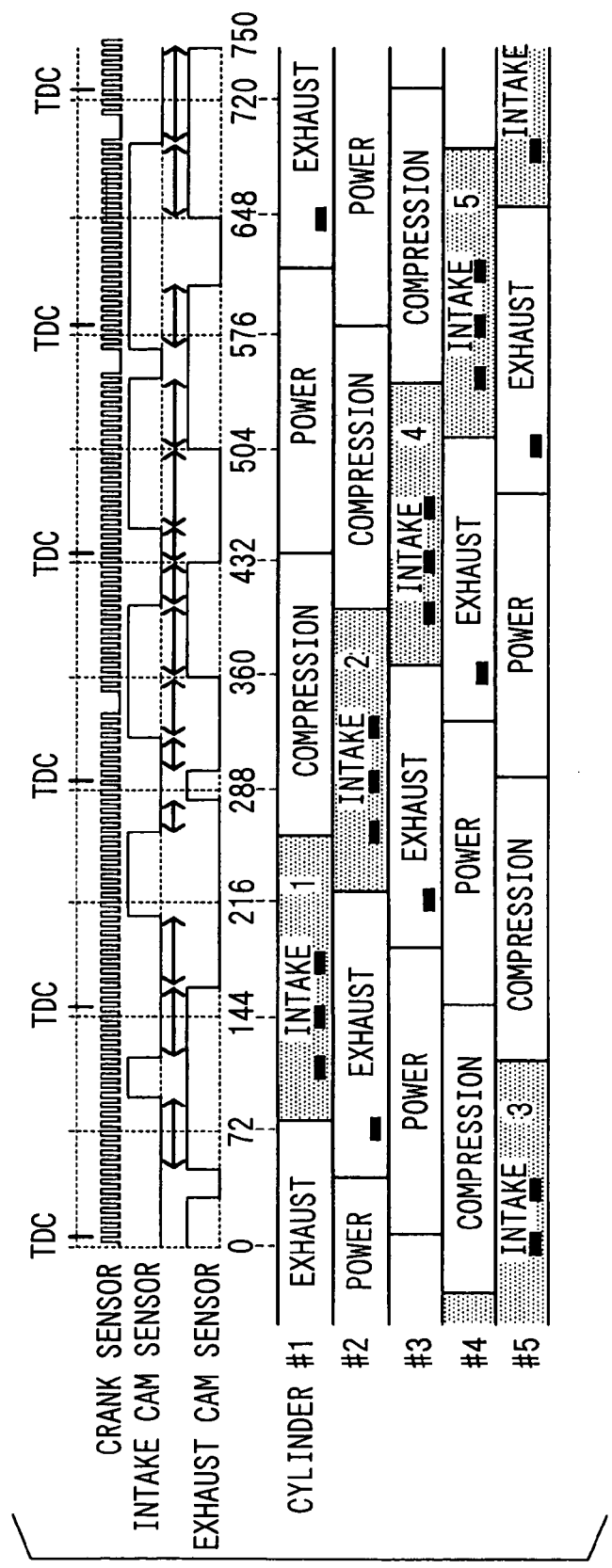
FIG. 6 is a time chart for explaining the changing positions of output signal levels.

In the five-cylinder engine according to the embodiment, the signal changing positions of the cam sensors 21, 22 are arranged in 20 positions. The initial signal changing positions at the time of engine starting are arranged in such a manner to correspond to positions or right before positions in which the fuel cam can be initially injected. Thereby, the initially fuel-injectable cylinders can be determined at the time of engine starting to conduct the fuel injection in a short period. Arrows in FIG. 5 shows the relationship between the positions in which the fuel can be initially injected and the signal changing positions.

[Standard #2]

Each of the cam sensor 21, 22 is structured in such a manner that each of the signal changing positions is positioned apart from each other more than a cam angle fluctuating range due to the variable valve timing control or tolerance of parts. Thus, even if the intervals between the signal changing positions (teeth edges of the cam rotor 21a) of the intake cam sensor 21 and the signal changing positions (teeth edges of the cam rotor 22a) of the exhaust cam sensor 22 are varied by the cam angle fluctuations due to the variable valve timing control or tolerance of parts, it is prevented that the order of two signal changing positions are reversed or in almost the same, so that the order of the signal changing positions (the order of combination variation of the output signal level) are precisely detected.

In this case, it is preferable that each of the cam sensor 21, 22 are structured in such a manner that each of the signal changing positions are arranged at or around a center position between two adjacent signal changing positions of the other cam sensor. Thereby, the intervals between the signal changing positions of intake cam sensor 21 and the exhaust cam sensor 22 are expanded in a proper balance to prevent the cylinder misidentification due to the variable valve timing control or the tolerance of pars.

[Standard #3]

When the engine is stopped, the stop position of the engine is determined based on the order of combination variation of the output signals from each of the cam sensor 21, 22. The stop position of the engine represents the cylinders in the intake stroke and the compression stroke while the engine stops. The backup RAM stores the stop position of the engine. If the piston in a compression stroke cannot pass over the top dead center (TDC) by a compression pressure in the cylinder just before the engine stops completely, the precise detection of the stop position of the engine is hardly obtained. The cylinder identification based on the stored stop position of the engine may cause that the fuel injection is conducted in incorrect cylinders due to the misidentification of the cylinder at the time of engine starting.

According to the embodiment, the cylinder identification and the fuel injection are suspended until the cam angle of either intake camshaft or exhaust camshaft is in the signal changing position thereof. This function serves as a suspending means in the present invention. Therefore, even if the stop position of the engine is precisely detected, the cylinder identification is correctly conducted to enhance the startability of the engine.

[Standard #4]

Figure 7:
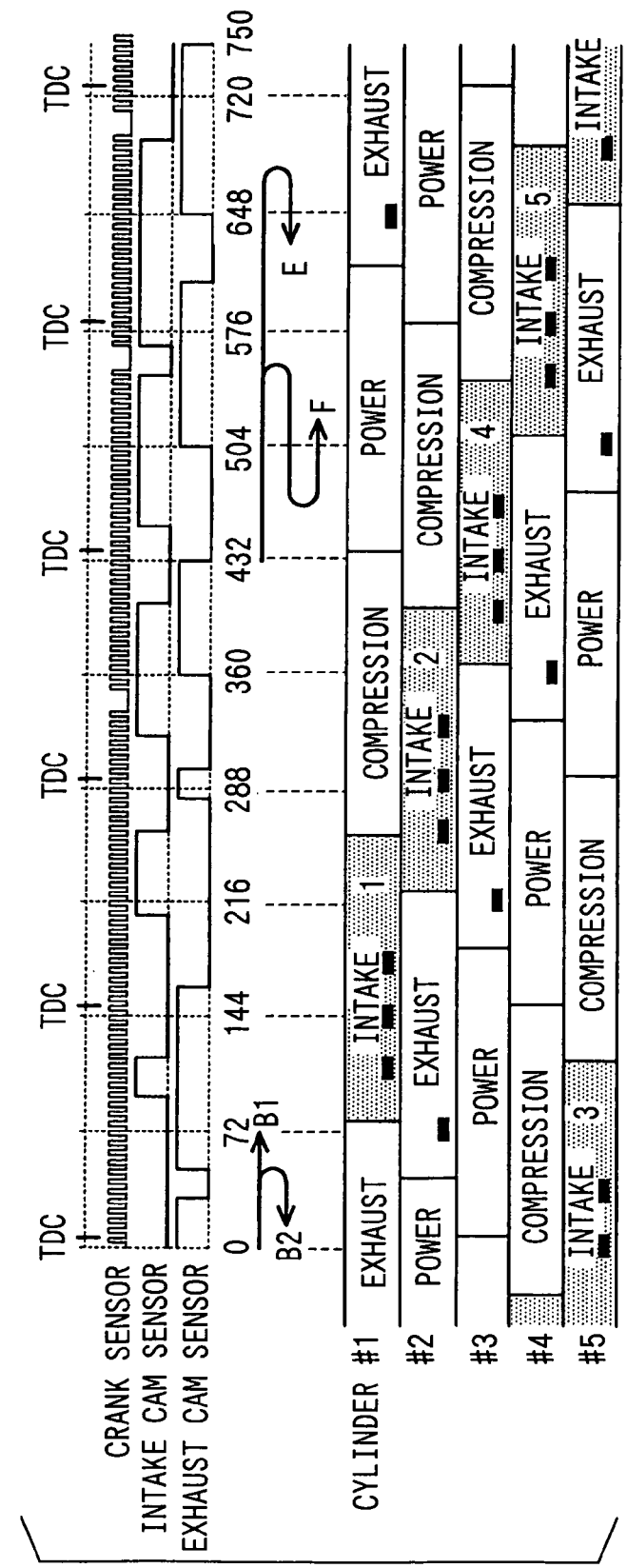
FIG. 7 is a time chart for explaining a normal and a reverse stroke of pistons right before the engine stopping.

When a plurality of potential stop positions of the engine exist in determining the stop position of the engine at the time of the engine stopping, the ECU 25 neglects the potential stop positions of the cylinders which reverse form the position after a TDC and before the middle position between adjacent two TDCs. An arrow B2 in FIG. 7 shows the neglectable potential stop position. That is, the reverse stroke just before complete engine stopping is occurred because the piston in compression stroke cannot pass over the TDC as shown by an arrow E in FIG. 7. Since the reverse stroke of the engine cannot be occurred before the center position between adjacent two TDCs, the potential stop position can be neglected.

[Standard #5]

When a plurality of potential stop positions of the engine exist in determining the stop position of the engine at the time of the engine stopping, the ECU 25 neglects the potential stop positions in which the pulse intervals of the crank sensor 20 increases once and then decreases. When the crankshaft 12 reversely rotates, the rotational speed of the crankshaft 12 in a normal rotation decreases to be zero, and then the crankshaft 12 rotates in the reverse rotation. At the position where the crankshaft 12 stops, the pulse interval of the crank sensor 20 is shortened. Thus, when a plurality of potential stop positions exists, if the pulse interval of the crank sensor 20 increases once and then decreases, the potential stop position in the normal rotation can be neglected.

In this case, since the crank rotor 20a of the crank sensor 20 has the teeth-lacked portion to detect the reference crank angle position, the pulse interval increases at the teeth-lacked portion. Thus, when the engine is off, the ECU 25 may determine the teeth-lacked portion as if the crankshaft 12 rotates in the reverse direction.

In order to avoid the above problem, the crank sensor 20 has a teeth-lacked portion out of the crank angle range in which the crankshaft 12 may rotate in the reverse direction. Thus, the crank angle range in which the crankshaft 12 reversely rotates does not overlap with the teeth-lacked portion, so that the erroneous determination can be avoided.

Figure 8:
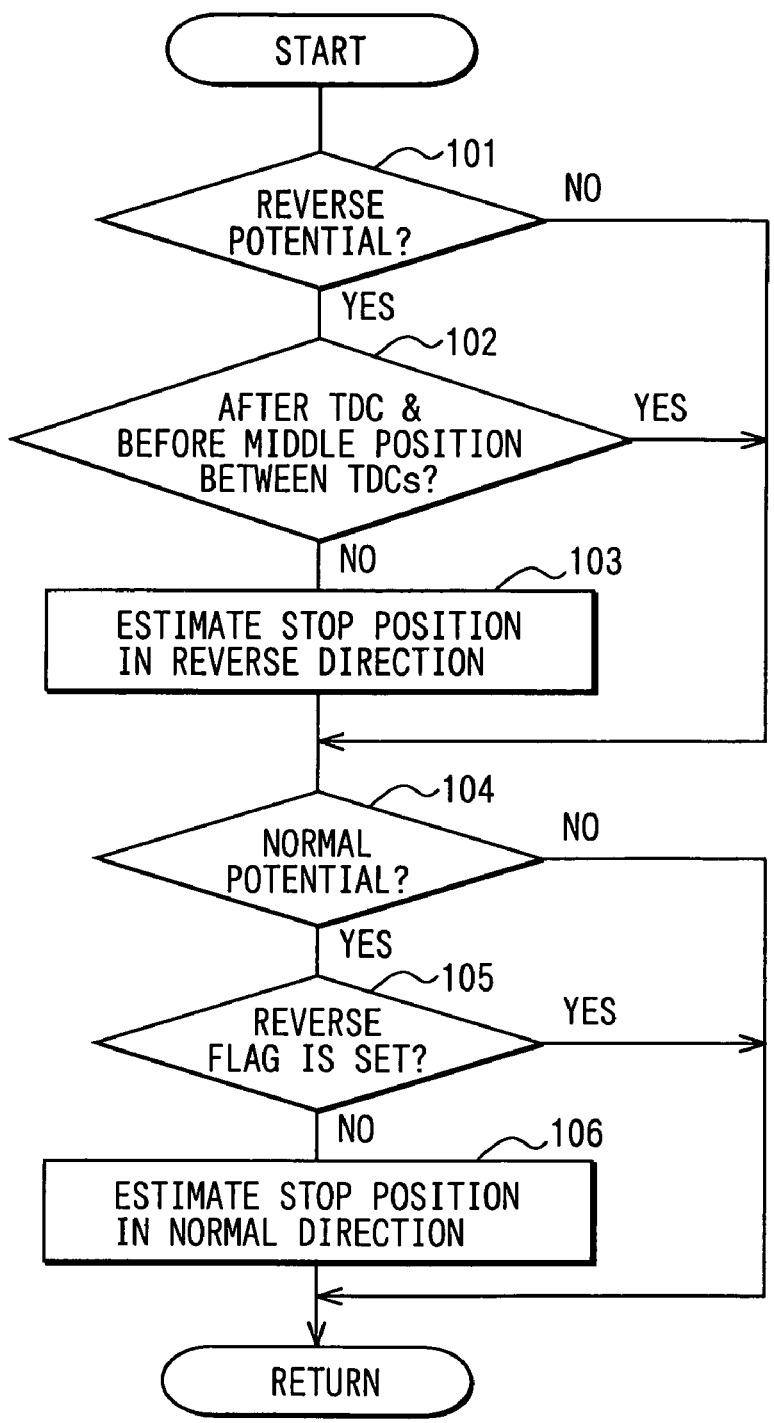
FIG. 8 is a flowchart showing a program routine for estimating a stop position of the engine with a cam sensor.
Figure 9:
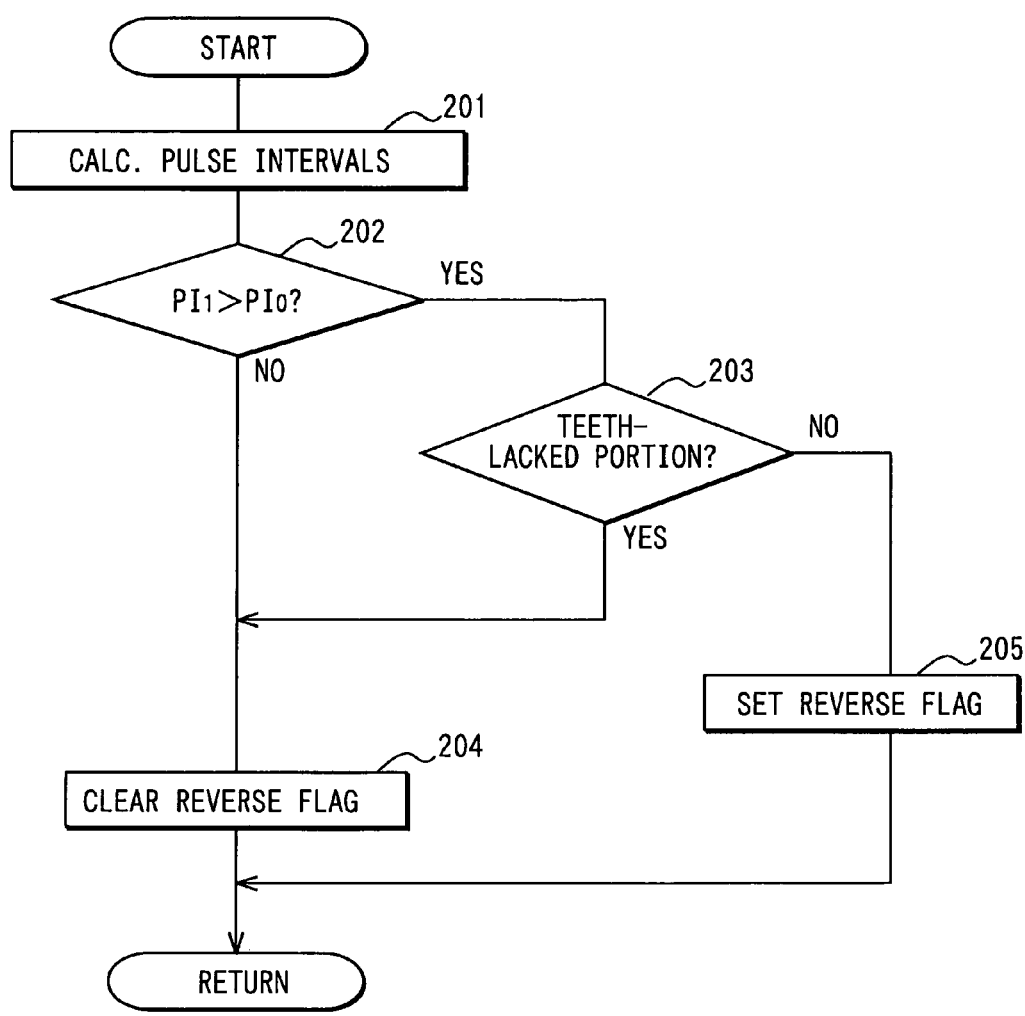
FIG. 9 is a flowchart showing a program routine for estimating a stop position of the engine with a crank sensor.

The ECU 26 executes a program routine for estimating a stop position of the engine with a cam sensor, which is shown in FIG. 8, to narrow the potential stop position of the engine 11 with the standard #4, and executes a program routine for estimating a stop position of the engine with a crank sensor, which is shown in FIG. 9, to narrow the potential stop position of the engine 11 with the standard #5.

The program routine shown in FIG. 8 is initiated in synchronization with an input timing of edge signals (signal changing positions) of the intake and exhaust cam sensors 21, 22, and serves as a stop position determining means in the present invention. In step 101, the ECU 25 determines whether a potential stop position (shown by the arrows B2, E in FIG. 7, for example) which may be reversed exists among the potential stop positions determined based on the order of combination variation of the output signals of the intake and exhaust cam sensors 21, 22. When it is No in step 101, the procedure proceeds to step 104.

When it is Yes in step 101, the procedure proceeds to step 102 in which the ECU 25 determines whether a potential stop position (shown by the arrow B2 in FIG. 7) exists, the potential stop position reversing form the position after a TDC and before the middle position between adjacent two TDCs. When it is No in step 102, the procedure proceeds to step 103 in which the present stop position is estimated among the stop positions in reverse rotational direction.

In step 104, the ECU 25 determines whether a potential stop position in a normal direction (shown by arrows B1, F in FIG. 7) exists among the potential stop positions. When the potential stop position in the normal direction does not exist, the procedure ends without processing following procedures.

When the potential stop position in the normal direction exists, the procedure proceeds to step 105 in which the ECU 25 determines whether a reverse flag is set, that is, whether the reverse stroke of the piston is detected based on the pulse intervals of the crank sensor 20. When the ECU 25 determines the reverse flag is not set, the procedure proceeds to step 106 in which the present stop position is estimated among the stop position in normal rotational direction.

The procedures in steps 101–106 are repeatedly proceeded every input timing of the edge signals of the cam sensors to determine a final stop position of the engine.

The program routine shown in FIG.9 is initiated in synchronization with an input timing of edge signals of the crank sensor 20, and serves as a stop position determining means in the present invention. In step 201, the intervals of edge signals of the crank sensor 20, which is pulse intervals, are calculated, and then the procedure proceeds to step 202 in which the ECU 25 determines whether the present interval of edges is longer than the previous interval of edges.

When it is No in step 202, that is, when the present interval $PI_1$ is equal to or shorter than the previous interval $PI_0$, the ECU 25 determines that no reverse stroke is occurred. Then procedure proceeds to step 204 in which the reverse flag is cleared to end the routine.

When the ECU 25 determines the present interval is longer than the previous interval in step 202, it represents either the reverse stroke or the teeth-lacked portion. The procedure proceeds to step 203 in which the ECU 25 determines whether the present crank angle position is positioned in the teeth-lacked portion. When the present crank angle is positioned in the teeth-lacked portion, the procedure proceeds to step 204 in which the reverse flag is cleared. When the present crank angle is not positioned in the teeth-lacked portion, the ECU 25 determines the reverse stroke is occurred to proceed to step 205 in which the reverse flag is set.

According to the present embodiment, the signal changing positions of at least one of the intake cam sensor 21 and the exhaust cam sensor 22 are arranged in such a manner to correspond to positions or right before positions in which the fuel can be initially injected at the time of the engine starting. Thus, the initially fuel-injectable cylinder can be determined at the time of the stating engine to conduct the fuel injection in a short period and enhance the startability of the engine.

Each of the cam sensor 21, 22 is structured in such a manner that each of the signal changing positions are positioned apart more than a cam angle fluctuating range due to the variable valve timing control or tolerance of parts. Thus, even if the intervals between the signal changing positions (teeth edges of the cam rotor 21a) of the intake cam sensor 21 and the signal changing positions (teeth edges of the cam rotor 22a) of the exhaust cam sensor 22 are varied by the cam angle fluctuations due to the variable valve timing control or tolerance of parts, it is prevented that the order of two signal changing positions are reversed or in almost the same, so that the order of the signal changing positions (the order of combination variation of the output signal level) are precisely detected to conduct the cylinder identification in a proper way.

According to the embodiment, the five-cylinder engine has twenty signal changing positions of the cam sensors 21, 22. The number of the signal changing position is not restricted unless the number of the signal changing portions is equal to or grater than the number of cylinder of the engine.

The number of the cylinder of the engine is not restricted.

What is claimed is:

1. A cylinder identification devise for an internal combustion engine, comprising:
   an intake cam sensor detecting a rotational angle of an intake camshaft and outputting a detected signal of which a signal level is varied according to the rotational angle of the intake camshaft;

an exhaust cam sensor detecting a rotational angle of an exhaust camshaft and outputting a detected signal of which a signal level is varied according to the rotational angle of the exhaust cam shaft; and a means for identifying a cylinder into which a fuel is injected according to an order of combination variation of the signal levels of the signals detected by the intake cam sensor and the exhaust cam sensor, wherein changing positions of the signal levels of at least on of the intake cam sensor and the exhaust cam sensor are arranged in such a manner to correspond to positions or right before positions in which the fuel can be initially injected at the time of the engine starting.

2. The cylinder identification device according to claim 1, wherein the intake cam sensor and the exhaust cam senor are respectively structured in such a manner that each of the changing positions of the signal level is positioned apart from each other more than a cam angle fluctuating range.

3. The cylinder identification device according to claim 2, wherein the cam angle fluctuating range is generated due to a variable valve timing control and/or tolerances of parts.

4. The cylinder identification device according to claim 2, wherein the intake cam sensor and the exhaust cam sensor are respectively structured in such a manner that each of the changing positions of the signal level is arranged at or around a center position between two adjacent changing positions of the signal level of the other cam sensor.

5. The cylinder identification device according to claim 1, further comprising:

a stop position determining means for determining a stop position of the internal combustion engine according to the order of combination variation of the signal levels of the signals detected by the intake cam sensor and the exhaust cam sensor: and a suspending means for suspending the cylinder identification and the fuel injection until the cam angle of one of the intake camshaft and the exhaust camshaft is in the changing position of the output signal levels thereof.

6. The cylinder identification device according to claim 5, wherein the stop position determining means neglects potential to stop positions of cylinders which may reverse form a position before a middle position between adjacent two Top Dead Centers when a plurality of potential stop positions of the internal combustion engine exist in determining a stop position of the internal combustion engine at a time of an engine stopping, the potential stop positions of the cylinders being determined according to the order of combination variation of the signal levels of the signals detected by the intake cam sensor and the exhaust cam sensor.

7. The cylinder identification device according to claim 5, further comprising a crank sensor which outputs a pulse signal every predetermined crank angle of a crankshaft of the internal combustion engine, wherein when a plurality of potential stop positions exists, if the pulse interval of the crank sensor increases and then decreases, the stop position determining means neglects the potential stop position in the normal rotation direction.

8. The cylinder identification devise according to claim 7, wherein the crank sensor has a teeth-lacked portion out of the crank angle range in which the crankshaft may rotate in the reverse direction, so that no pulse signal is output.

* * * * *